United States Patent
Thomsen

(10) Patent No.: US 9,792,739 B2
(45) Date of Patent: Oct. 17, 2017

(54) OPERATION MONITORING SYSTEM FOR MACHINE AND METHOD THEREOF

(71) Applicant: Caterpillar Inc., Peoria, IL (US)

(72) Inventor: Anders C. Thomsen, Mariager (DK)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 14/964,709

(22) Filed: Dec. 10, 2015

(65) Prior Publication Data
US 2017/0169626 A1 Jun. 15, 2017

(51) Int. Cl.
G07C 5/02 (2006.01)
B60P 1/04 (2006.01)
G01P 15/02 (2013.01)
G01C 19/02 (2006.01)
G06Q 50/02 (2012.01)
G06Q 50/08 (2012.01)
G06Q 10/08 (2012.01)

(52) U.S. Cl.
CPC .............. *G07C 5/02* (2013.01); *B60P 1/04* (2013.01); *G01C 19/02* (2013.01); *G01P 15/02* (2013.01); *G06Q 50/02* (2013.01); *G06Q 50/08* (2013.01); *G06Q 10/08* (2013.01)

(58) Field of Classification Search
None
See application file for complete search history.

(56) References Cited

U.S. PATENT DOCUMENTS

| | | | |
|---|---|---|---|
| 5,327,347 A | 7/1994 | Hagenbuch | |
| 5,956,250 A * | 9/1999 | Gudat | B60K 31/0008 318/587 |
| 7,894,961 B2 * | 2/2011 | Blackburn | G07C 5/085 180/271 |
| 8,571,762 B2 * | 10/2013 | McAree | E02F 3/304 342/357.28 |
| 8,833,861 B2 * | 9/2014 | Donnelli | G01P 15/00 298/17 S |
| 2012/0053805 A1 * | 3/2012 | Dantu | B60W 40/09 701/70 |

(Continued)

FOREIGN PATENT DOCUMENTS

WO 2005101271 10/2005
WO 2005101150 11/2005

OTHER PUBLICATIONS

Geotab, Inc., "GEOATB GO 7—The World's Only Expandable Plug-&-Play Platform", catalog, Jun. 2014, 5 pages, Canada.

*Primary Examiner* — Redhwan K Mawari
*Assistant Examiner* — Edward Torchinsky

(57) ABSTRACT

An operation monitoring system for a machine is provided. The operation monitoring system includes a frame and a dump body. The operation monitoring system further includes an inertial measurement unit to measure acceleration and rotation of the dump body. The operation monitoring system further includes a position determination unit to determine position of the machine. The operation monitoring system further includes a time logging unit to record a time entry. The operation monitoring system further includes a processing unit in communication with the inertial measurement unit, the position determination unit and the time logging unit. The processing unit is configured to determine operation states of the machine based on the received signals.

17 Claims, 4 Drawing Sheets

(56) References Cited

U.S. PATENT DOCUMENTS

| | | | |
|---|---|---|---|
| 2015/0088708 A1* | 3/2015 | Fain | G06Q 10/08 |
| | | | 705/32 |
| 2015/0112769 A1 | 4/2015 | Collins | |
| 2015/0134184 A1* | 5/2015 | Takeda | G05D 1/0278 |
| | | | 701/24 |
| 2015/0178859 A1 | 6/2015 | Takeda | |

* cited by examiner

OPERATION MONITORING SYSTEM FOR MACHINE AND METHOD THEREOF

TECHNICAL FIELD

The present disclosure generally relates to a system for monitoring an operation, and more particularly relates to an operation monitoring system for determining various operation states of a machine involved in the operation.

BACKGROUND

Certain operations, such as strip mining, involve transportation of extracted aggregate material, such as ore, from a loading site to a dumping site, such as a processing or a shipping facility. Typical mining operations involve loading of the aggregate material onto multiple haul trucks, which is typically accomplished by use of wheel loaders or excavators at the loading site, and carrying the aggregate material by the haul trucks to the dumping site. These haul trucks may perform hundreds of trips daily as some mining operations operate around the clock. Typically, the haul trucks are required to undergo various operating states, such as loading state, hauling state, dumping state, wasting state and bunching state during the transport from the loading site to the dumping site. It may be required to monitor the operations of the haul trucks in order to determine any bottlenecks in the transport chain and evaluate the performance of truck operators, and further to estimate an overall efficiency of the mining operation.

US Patent Publication No. 20150088708, hereinafter referred to as the '708 publication, discloses a tracking and management system for managing a fleet of delivery trucks and drivers. The tracking and management system, in the '708 publication, provides a mobile device application and an integrated software system for providing automated timekeeping, messaging, ticketing and billing operations. The '708 publication describes that data from sensors, like accelerometers and gyroscopes, in the mobile device can allow recreation of the data in the event of a safety incident or traffic accident, to track the vehicle, provide user feedback, calculate a driver's ranking, or the like.

SUMMARY OF THE DISCLOSURE

In one aspect of the present disclosure, an operation monitoring system for a machine is provided. The operation monitoring system includes a frame and a dump body. The operation monitoring system further includes an inertial measurement unit mounted on the dump body of the machine. The inertial measurement unit includes an accelerometer disposed to measure acceleration of the dump body and generate a first signal. The inertial measurement unit further includes a gyroscope disposed to measure a rotation of the dump body and generate a second signal. The operation monitoring system further includes a position determination unit present on-board the machine. The position determination unit is configured to determine a position of the machine and generate a third signal. The operation monitoring system further includes a time logging unit in communication with the inertial measurement unit and the position determination unit. The time logging unit is configured to record a time entry in response to generation of the first signal, the second signal and the third signal, and generate a fourth signal. The operation monitoring system further includes a processing unit in communication with the inertial measurement unit, the position determination unit and the time logging unit to receive the first signal, the second signal, the third signal and the fourth signal. The processing unit is configured to determine operation states of the machine based on the received signals.

In another aspect of the present disclosure, a method for monitoring operation of the machine is disclosed. The method includes step of generating a first signal indicative of an acceleration of the dump body. The method further includes a step of generating a second signal indicative of a rotation of the dump body. The method further includes a step of generating a third signal indicative of a position of the machine. The method further includes a step of generating a fourth signal indicative of a record of a time entry in response to generation of the first signal, the second signal and the third signal. The method further includes a step of determining operation states of the machine based at least in part on one of the first signal, the second signal, the third signal and the fourth signal.

In yet another aspect of the present disclosure, a machine is provided. The machine includes the frame, the dump body connected to the frame and the operation monitoring system. The operation monitoring system includes an inertial measurement unit mounted on the dump body of the machine. The inertial measurement unit includes an accelerometer disposed to measure an acceleration of the dump body and generate a first signal, and a gyroscope disposed to measure a rotation of the dump body and generate a second signal. The system further includes a position determination unit configured to determine a position of the machine and generate a third signal. The system further includes a time logging unit in communication with the inertial measurement unit and the position determination unit, the time logging unit configured to record a time entry in response to generation of the first signal, the second signal and the third signal, and generate a fourth signal. The system further includes a processing unit in communication with the inertial measurement unit, the position determination unit and the time logging unit to receive the first signal, the second signal, the third signal and the fourth signal. The processing unit is configured to determine operation states of the machine based on the received signals.

Other features and aspects of this disclosure will be apparent from the following description and the accompanying drawings.

DETAILED DESCRIPTION

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
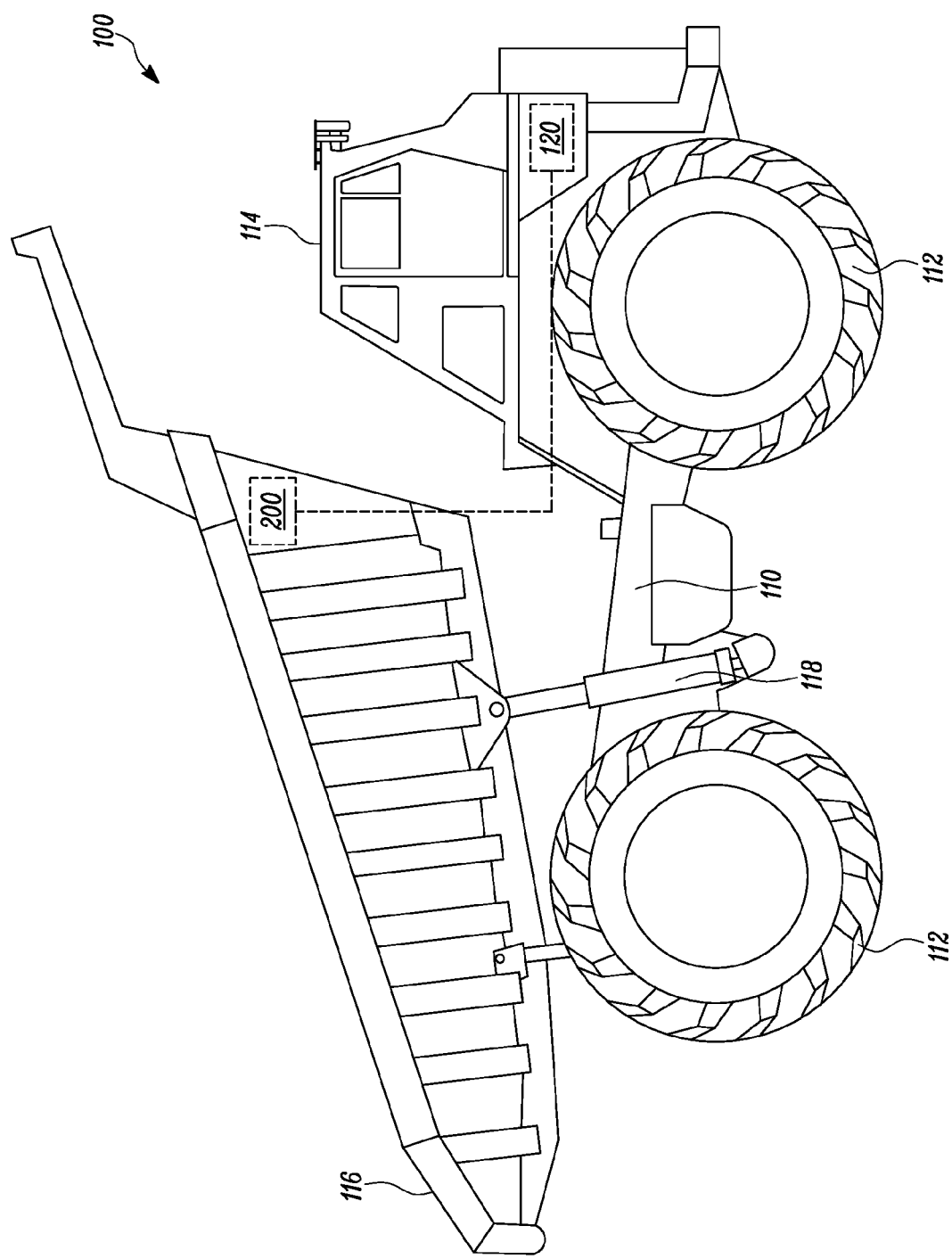
FIG. 1 is a planar side view of a machine with an operation monitoring system for the machine, according to an exemplary embodiment of the present disclosure.

FIG. 1 illustrates a machine, generally indicated by numeral 100, in which the embodiments of the present disclosure may be implemented. In the illustrated example, the machine 100 is shown as a large mining truck, sometimes also known as haul tucks. For the purpose of the present disclosure, hereinafter the terms "machine" and "haul truck" have been interchangeably used. It should be noted that the machine 100 may alternatively be any other machine, such as, but not limited to, articulated trucks, on-road trucks and related trailers, capable of transporting material from one location to another location. The machine 100 of the present disclosure may be configured to perform operations related to various industries like mining, forestry, waste management, construction and quarry, transportation, logistics, agriculture, etc.

The machine 100 includes a frame or a chassis 110. A powertrain (not shown) may be provided on the machine 100 which may include one or more power sources. An enclosure (not shown) may be provided on the frame 110 which may house the power source (not shown). The power source may be any one or a combination of an internal combustion engine, a gas turbine, a hybrid engine, a non-conventional power source like batteries, electric motor, or any other power source known in the art. The powertrain may further include a transmission inclusive of gearing, drive shafts, propeller shaft and other known drive links provided for transmission of motive power from the power source to a set of ground engaging members 112. The ground engaging members 112, such as wheels, may be provided to the machine 100 for the purpose of mobility. An operator cabin 114 is provided on the machine 100 which may house various controls of the machine 100.

Referring to FIG. 1, as illustrated, a dump body 116 is pivotally mounted on the frame 110 of the machine 100. In one example, hydraulic and/or pneumatic cylinders 118 may be mounted on the frame 110 and connected to the dump body 116 to enable movement in the form of tilting of the dump body 116 with respect to the frame 110. In other example, the dump body 116 may be of ejector type, or side dump type, or bottom dump type, that are well known in the art. The dump body 116 may be appropriately constructed to perform an intended task of transportation of payload. The machine 100 may further include a controller 120 to receive parameters of the machine 100 such as, but not limited to, engine condition, speed of the machine, distance travelled, etc. The dump body 116 may receive, transport and dump the payload from a source such as a loading site 336 (shown in FIG. 3) to a dumping site 338 (shown in FIG. 3), such as, a processing facility 330 (shown in FIG. 3) or a shipping facility. The payload may include construction material and/or other material like, sand, gravel, stones, rocks, soil, excavated material, asphalt, coal, mineral ores, and the like.

Figure 2:
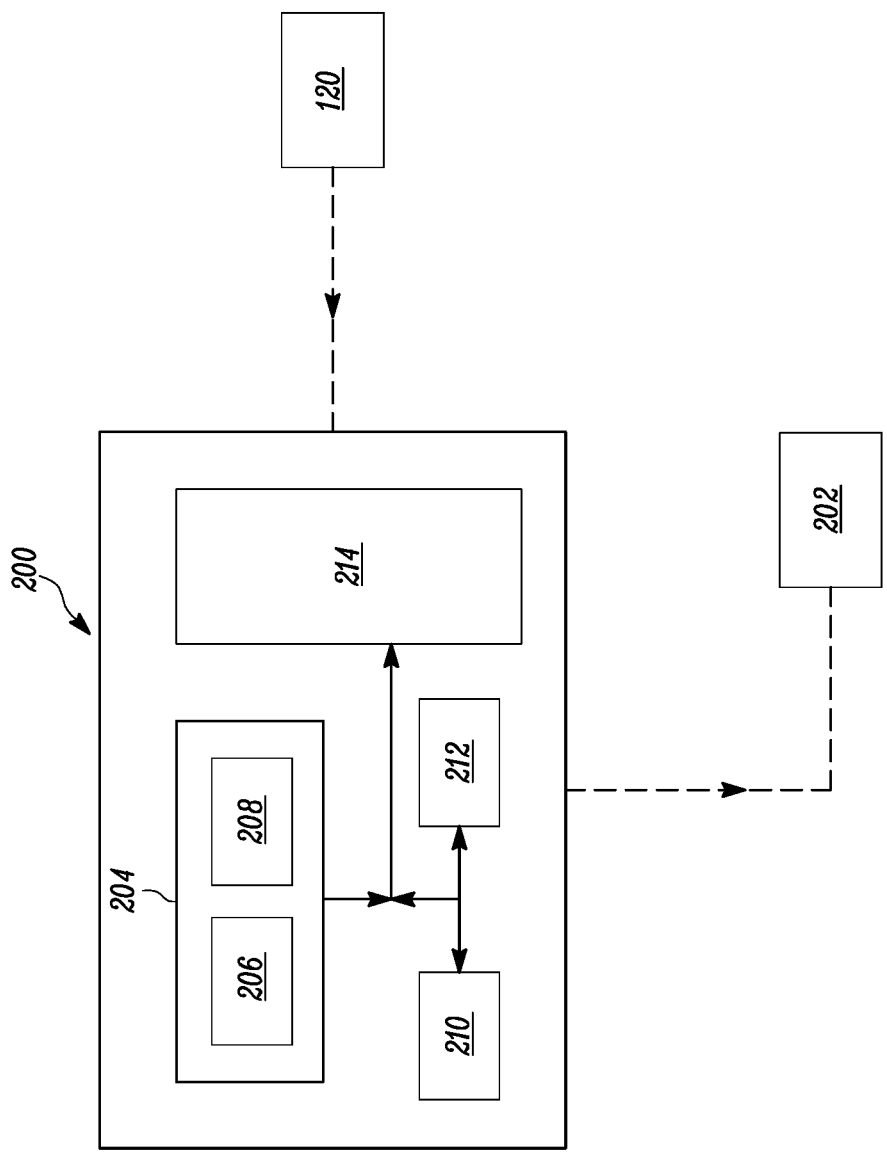
FIG. 2 is a schematic block diagram of the operation monitoring system with a controller of the machine and a remote station, according to an exemplary embodiment of the present disclosure.

According to an embodiment, the present disclosure further provides an operation monitoring system 200 for monitoring the operation of the machine 100. FIG. 2 illustrates a block diagram schematically depicting the operation monitoring system 200 in communication with the controller 120, of the machine 100, and a remote station 202, according to an exemplary embodiment of the present disclosure. The operation monitoring system 200 is in communication with the controller 120 of the machine 100 to receive parameters of the machine 100 such as, engine condition, speed of the machine, distance travelled, etc. The operation monitoring system 200 is also in communication with the remote station 202 to communicate an operation state of the machine 100, as determined. In one example, the operation monitoring system 200 may be disposed in the machine 100, or specifically the dump body 116 of the machine 100. In another example, the operation monitoring system 200 may be partially disposed in the machine 100 and partially in the remote station 202, as will be described later.

In an embodiment, the operation monitoring system 200 includes an inertial measurement unit 204 disposed on the dump body 116 of the machine 100. In an embodiment, the inertial measurement unit 204 includes an accelerometer 206 to measure an acceleration of the dump body 116 with respect to the frame 110, in the machine 100. The accelerometer 206 is configured to generate a first signal in response to the acceleration of the dump body 116 with respect to the frame 110, for example, when the dump body 116 of the machine 100 is loaded with aggregate material by an excavator 304 at the loading site 336 (shown in FIG. 3), the dump body 116 of the machine 100 undergoes a downward displacement with respect to the frame 110 due to the weight of the aggregate material loaded into the dump body 116. In an embodiment, the inertial measurement unit 204 further includes a gyroscope 208 to measure rotation of the dump body 116 with respect to the frame 110, in the machine 100. In one example, the rotation of the dump body 116 with respect to the frame 110 may be measured by an accelerometer, or alternatively by a combination of accelerometer and gyroscope. The gyroscope 208 is configured to generate a second signal in response to the rotation of the dump body 116 with respect to the frame 110, for example, during unloading of the aggregate material by the machine 100, from the dump body 116 at the dumping site 338 (shown in FIG. 3). It may be understood that references made about measurement of acceleration, movement or rotation of the dump body 116 with respect to the frame 110 (as defined) may be considered equivalent to measurements of acceleration, movement or rotation of the dump body 116 with respect to the gravity.

In an embodiment, the operation monitoring system 200 further includes a position determination unit 210 disposed on-board the machine 100. The position determination unit 210 is configured to determine a position of the machine 100 with reference to the loading site 336 or any other predefined location at any given point of time. In an embodiment, the position determination unit 210 may be configured to generate a third signal based on the position of the machine 100. In an exemplary embodiment, the position determination unit 210 may include, but not limited to, a Global Positioning System (GPS), Global Navigation Satellite System (GNSS), and trilateration/triangulation of cellular networks or Wi-Fi networks.

In an embodiment, the operation monitoring system 200 further includes a time logging unit 212 for recording time entries in response to generation of the first signal, the second signal and the third signal. For this purpose, the time logging unit 212 is in communication with the inertial measurement unit 204 and the position determination unit 210. It may be contemplated that the time logging unit 212 may be any digital timer capable of recording a time entry in response to receiving a specific signal, for example timing device based on Global Navigation Satellite System (GNSS), Internet Time, or the like. In one embodiment, the time logging unit 212 is configured to generate a fourth signal based on the time entry, such that the fourth signal is in relation to one or more of the first signal, the second signal and the third signal.

In an embodiment, the operation monitoring system 200 may further include a processing unit 214 to process the signals received from the inertial measurement unit 204, the position determination unit 210 and the time logging unit 212 to determine the operation state of the machine 100. The processing unit 214 receives the first signal, the second signal, the third signal and the fourth signal to determine the operation state of the machine 100, as described in the subsequent paragraphs. The determined operation state of the machine 100 is communicated to the remote station 202. In one example, the processing unit 214 may be disposed in the machine 100. In another example, the processing unit 214 may be disposed in the remote station 202. In an embodiment, the processing unit 214 is further configured to determine a movement of the machine 100 based on the third signal and the fourth signal, and generate a fifth signal in response to the movement of the machine 100.

Figure 3:
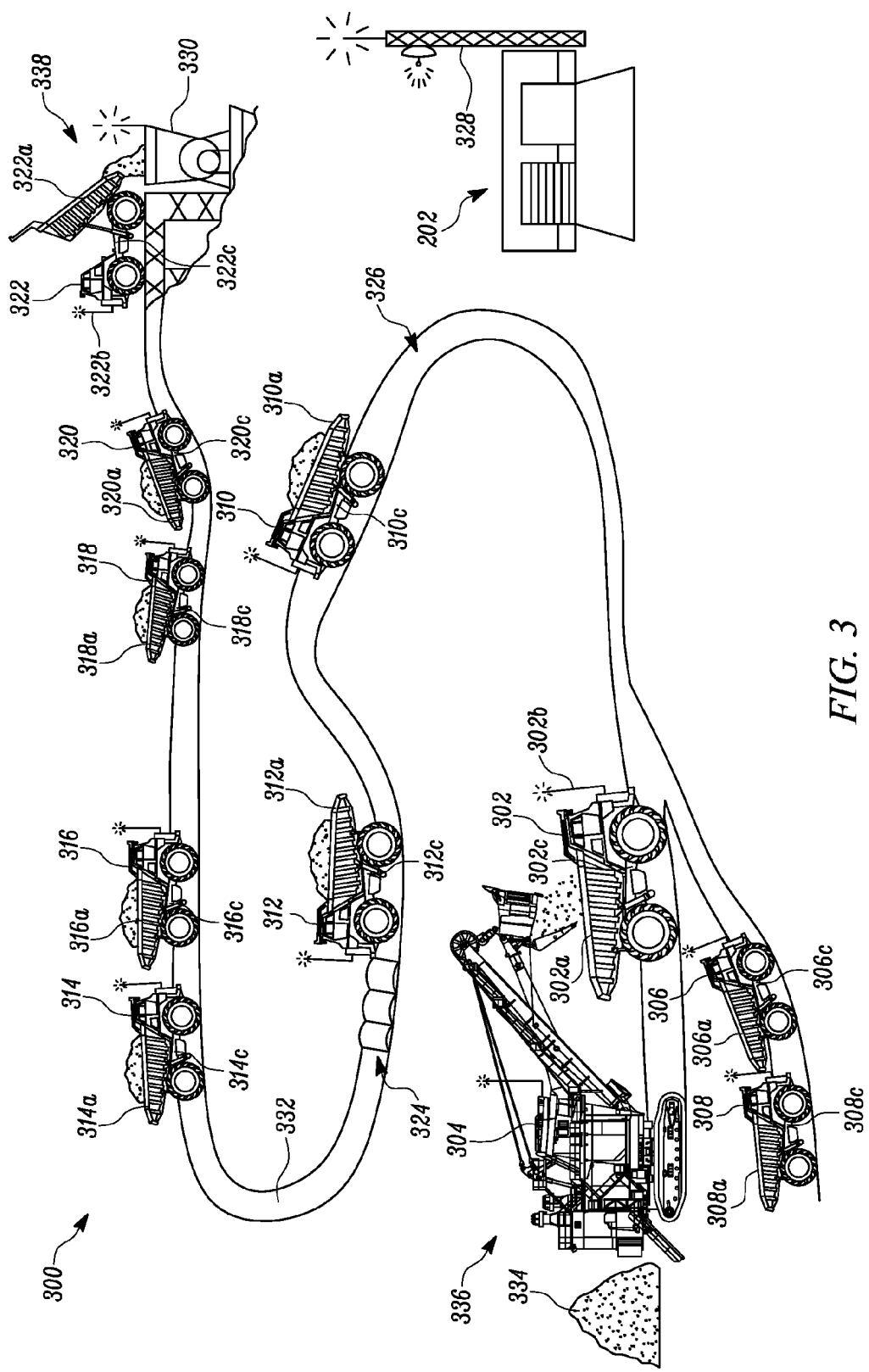
FIG. 3 is a schematic depiction of various operating states of a plurality of machines involved in a mining operation, according to an exemplary embodiment of the present disclosure.

FIG. 3 depicts an exemplary mining operation, generally indicated by the numeral 300, showing a plurality of machines at various operating states between the loading site 336 and the dumping site 338. Each of the plurality of machines, as illustrated, includes the operation monitoring system 200 of the present disclosure. The operation states of the machine include, but are not limited to, a loading state, a hauling state, a bunching state, a dumping state, a wasting state and an accident state. The remote station 202 includes an antenna 328 configured to receive the signal indicative of the operation state of the plurality of the machines plying between the loading site 336 and the dumping site 338. In one example, the remote station 202 may be located at a distinct place from the loading site 336. The remote station 202 may be supervised by a supervisor who may take necessary actions in response to the operation state(s) relating to any machine plying between the loading site 336 and the dumping site 338.

In the illustrated embodiment, a machine 302 is depicted in the 'loading state' which is defined as the operation state in which a dump body 302a of the machine 302 is loaded with the aggregate material by the excavator 304. The loading of the aggregate material into the dump body 302a of the machine 302 is typically carried-out at a first location such as, the loading site 336. However, it may be contemplated that the loading of the dump body 302a of the machine 302 may also take place at any location other than the loading site 336. For example, the loading may take place at the processing facility 330 after processing of the aggregate material for transporting the processed aggregate material from the processing site 330 to a shipping site (not shown).

In the illustrated embodiment, the dump body 302a of the machine 302 is loaded with the aggregate material from a heap of aggregate material 334 by an excavator 304. In an exemplary embodiment, the excavator 304 may include industrial machines such as a backhoe loader, shovel, or any other construction machines that serves the purpose of loading the aggregate material into the dump body 302a. The excavator 304 lifts the aggregate material using a bucket from the heap of the aggregate material 334 at the loading site 336 and dumps the lifted aggregate material into the dump body 302a of the machine 302. The machine 302 remains stationary, and the dump body 302a remains in a horizontal position with respect to a frame 302c during the loading. The dump body 302a loaded with the aggregate material experiences the acceleration by way of displacement from an initial position. The displacement of the dump body 302a occurs with respect to the frame 302c and is perpendicular to a ground surface. The displacement of the dump body 302a is measured by the accelerometer 206. The accelerometer 206 generates the first signal indicative of displacement/acceleration of the dump body 302 with respect to the frame 302c and is configured to communicate the first signal to the time logging unit 212 and the processing unit 214.

During loading of the dump body 302a, the machine 302 is located at the loading site 336 and remains substantially stationary. The position determination unit 210 generates the third signal indicative of the position of the machine 302 to be at the loading site 336. The third signal is communicated to the processing unit 214. The processing unit 214 generates the fifth signal indicative of the machine 302 in the substantially stationary position. The processing unit 214 further determines that the machine 302 is in the 'loading state' based on the first signal, the third signal and the fifth signal. A transmission unit such as, an antenna 302b is disposed in the machine 302, for communicating the signals and/or the operation state of the machine 302. The antenna 302b is communicatively coupled between the operation monitoring system 200 and the remote station 202. Specifically, the 'loading state' of the machine 302 is communicated to the remote station 202 via the antenna 302 and/or may be stored for further analysis by the operation monitoring system 200.

In an exemplary embodiment, the operation monitoring system 200 may also be disposed in the excavator 304. The operation monitoring system 200 may be configured to determine operations of the excavator 304 such as, but not limited to, number of loading cycles, horizontal distance between the excavator 304 and the machine 302, vertical distance between the dump body 302a of the machine 302 and a bucket of the excavator 304. The operation monitoring system 200 may also be configured to determine time required for loading the aggregate material in the dump body 302a of the machine 302. Further, the operation monitoring system 200 disposed in the excavator 304 may keep a record of all the machines that are loaded by the excavator 304. The operation monitoring system 200 may also be used to determine as to which excavator has loaded which machine and at what time the excavator has loaded the machine. The operation monitoring system 200 may store recorded data at the remote station 202 using a coding scheme such as a unique identifying number for each of the machines involved in the operation 300.

As illustrated, while the machine 302 is loaded, a machine 306 and a machine 308 are waiting for loading of the aggregate material at the loading site 336. The operation monitoring systems 200 for the machine 306 and the machine 308 communicate the operation states of the machine 306 and the machine 308 as 'bunching state' to the remote station 202. The 'bunching state' of the machines 306 and 308 as referred herein, is the operation state of the machine 306 during which the machine 306 is waiting at the loading site 336 or the dumping site 338 for loading or unloading of the aggregate material. Typically, the 'bunching state' of the machine may occur due to a queue of other machines located at the loading site 336 or the dumping site 338.

In an embodiment, the machine 306 and the machine 308 are determined to be in the 'bunching state' as the first signals from the accelerometers 206, of the corresponding machines, indicate a substantially zero acceleration of a dump body 306a and a dump body 308a with respect to a frame 306c and a frame 308c respectively, the second signals from the gyroscopes 208 indicate a substantially zero rotation of the dump body 306a and the dump body 308a with respect to the frame 306c and the frame 308c, and the fifth signals from the processing units 214 indicate the machines 306, 308 are stationary. Optionally, the operation monitoring systems 200 may also consider the third signals from the position determination unit 210 to determine the 'bunching state' of the machine 306 and the machine 308, that is, if the third signal indicates positions of the machine 306 and the machine 308 coinciding with the position of the loading site 336.

Further, as illustrated in FIG. 3, the machine 310 loaded with the aggregate material is in transit from the loading site 336 towards the dumping site 338. The operation monitoring system 200 disposed in the machine 310 determines the operation state of the machine 310 as the 'hauling state'. The 'hauling state' of the machine 310 as referred herein, is the operation state of the machine 310 during which the machine 310 is carrying the loaded aggregate material from the loading site 336 to the dumping site 338. It may be contemplated that in the 'hauling state', the machine 310 may also transport the loaded aggregate material from the loading site 336 to the processing facility 330 or from the processing facility 330 to the shipping facility.

In an embodiment, the machine 310 is determined to be in the 'hauling state', when the first signal from the accelerometer 206 indicates a zero or substantially zero acceleration of a dump body 310a with respect to a frame 310c, when the second signal from the gyroscope 208 indicates a zero or substantially zero rotation of the dump body 310a with respect to the frame 310c, and when the fifth signal from the processing unit 214 indicates a movement of the machine 310 along a predefined travel path. Optionally, the operation monitoring system 200 may also consider the scenario when the position determination unit 210 determines that the machine 310 is neither at the loading site 336 nor at the dumping site 338, to predict the machine 310 to be in the 'hauling state'.

Further, as illustrated, the machines 310, 312 are in transit from the loading site 336 to the dumping site 338. In the illustrated example, the machine 310 faces a rolling resistance due to uphill road in a steep road 326. It may be contemplated by a person skilled in the art that the operation monitoring system 200 may determine the rolling resistance by considering the first and second signals from the accelerometer 206 and the gyroscope 208, respectively, of the inertial measurement unit 204. Similarly, the operation monitoring system 200 determines that the machine 312 is facing obstacles in the road 332 such as, road bumps 324, or uneven roads, slope, etc.

Further, as illustrated, the machine 314 loaded with the aggregate material is traveling from the loading site 336 to the dumping site 338. In one example, the machine 314 may come across with another machine 316 ahead of it, which may be moving at a lower speed than the machine 314. Thus, the speed of the machine 314 has to be reduced as the machine 316, in front, is moving at a lower speed than the machine 314. In another example, the machine 314 may have to come to a complete halt due to various reasons, like the machine 314 may face some major obstacle on the travel path, the operator may decide to rest for a while, or the like. In such cases, the operation monitoring system 200 disposed in the machine 314 determines the operation state of the machine 314 as the 'wasting state'. The 'wasting state' of the machine 314 as referred herein, is an operation state of the machine 314 during which the machine 314 is standing stationary or moving at a slower speed than usual, and further not being located at either the loading site 336 or the dumping site 338. The 'wasting state' can occur at any location between the loading site 336 and the dumping site 338.

In an embodiment, the machine 314 is determined to be in the 'wasting state', when the first signal from the accelerometer 206 indicates zero acceleration of a dump body 314a with respect to a frame 314c, when the second signal from the gyroscope 208 indicates zero rotation of the dump body 314a with respect to the frame 314c, when the third signal from the position determination unit 210 indicates the position of the machine 314 coinciding neither with the position of the loading site 336 nor the dumping site 338, and when the fifth signal from the processing unit 214 indicates the machine 314 is stationary or substantially stationary. Thus the processing unit 214 determines that the operation state of the machine 314 is the wasting state and is communicated to the remote station 202.

Further, as illustrated, a machine 318 and a machine 320 loaded with the aggregate material are in the vicinity of the dumping site 338 and are awaiting their turn for dumping the aggregate material at the dumping site 338. In such situation, the operation monitoring system 200 communicates the operation states of the machine 318 and the machine 320 as the 'bunching state'. The machine 318 and the machine 320 are determined to be in the 'bunching state' when the first signals from the accelerometers 206 indicate substantially zero acceleration of a dump body 318a and a dump body 320a of the machine 318 and the machine 320 with respect to a frame 318c and a frame 320c, the second signals from the gyroscopes 208 indicate substantially zero rotation of the dump body 318a and 320a with respect to the frame 318c and the frame 320c, the third signals from the position determination units 210 indicate the positions of the machine 318 and the 320 coinciding with the position of the dumping site 338, and the fifth signals from the processing units 214 indicate the machine 318 and the machine 320 are stationary.

Further, as illustrated, a machine 322 is determined to be in the 'dumping state'. The 'dumping state' of the machine 322 as referred herein, is an operation state of the machine 322 during which the machine 322 unloads or dumps the aggregate material at the dumping site 338. It may be contemplated that the dumping site 338 may include the processing facility 330 or the shipping facility. The machine 322 is determined to be in a dumping state when the second signal from the gyroscope 208 indicates rotation of a dump body 322a with respect to a frame 322c and when the fifth signal from the processing unit 214 indicates the machine 322 is stationary. Optionally, the operation monitoring system 200 may also consider when the third signal from the position determination unit 210 indicates that the machine 322 is at the dumping site 338/processing unit 330 to estimate the 'dumping state' of the machine 322.

In another exemplary embodiment, any of the machines may meet with an accident during the travel between the loading site 336 and the dumping site 338. In an embodiment, the operation monitoring system 200 may indicate that the machine is in accident condition, when the accelerometer 206 and the gyroscope 208 of the machine may indicate that the acceleration and rotation of the dump body has exceeded the predetermined value. Further, the determined accident state of the machine is communicated to the remote station 202.

INDUSTRIAL APPLICABILITY

The present disclosure provides the operation monitoring system 200 for machines 100 involved in a mining operation. The operation monitoring system 200 provides easy and economical monitoring of the machines 100. The machines 100 may be monitored during its working and travel from the loading site 336 to the dumping site 338. As the data about the operation state is communicated to the remote station 202, the supervisor at the remote station 202 may resolve any issues that may occur during the operation. Thus, any downtime of the machine 100, or bunching/wasting time that may occur during the operation may be reduced. Further, the operation monitoring system 200 may be configured to communicate with the controller 120 of the machine 100, and in some cases also with the software known in the art to monitor operation's work cycle, and therefrom determine overall efficiency of the operation. The operation monitoring system 200 may also be used to track the unloaded material at the dumping site 338. This is achieved as the position determination unit 210 disposed in the operation monitoring system 200 may be configured to record the exact location of the machine 100 during the 'dumping state'.

The operation data obtained at the remote station 202 also helps to determine productivity of the operators controlling the machines involved in the operation. As discussed, the operation monitoring system 200 is in communication with the controller 120 to receive data about fuel consumption, application of brakes, etc. Therefore, the operation monitoring system 200 may be used to determine operator's performance during the travel. For example, in some case, if the operator may travel at higher speeds at any point of the travel, or may not apply brakes when the machine 100 come across the road bumps 324, etc., these abuses of the machine 100 may be determined using the present system, as may be contemplated by a person skilled in the art, and further these recorded actions of the operator may be used to estimate his/her performance. The supervisor may also rank the operator by determining if the operator is properly applying parking brakes when the machine 100 is in the 'loading state' and 'dumping state', or the like.

The operation monitoring system 200 may also be used to determine various road conditions such as, but not limited to, gradient of the roads, bumps or undulations located on the roads. Also, the position determination unit 210 disposed of the operation monitoring system 200 may be configured to map the route of the machines traveling from the loading site 336 to the dumping site 338/processing facility 330. Further, the supervisor at the remote station 202 may be notified if the travel path of the machine 100 is deviated from the predefined route, and can accordingly instruct the operator of the machine 100 to turn back to the predefined route for smooth operation. In yet another example, the supervisor or some computing algorithm may analyze the road conditions, including rolling resistance, steep slopes and bumps, at various turns, and determine an alternative travel path or make course corrections to avoid such travel path.

In an embodiment, the details of the operations of the machine 100 may be displayed at a dashboard or display located at the remote station 202. The supervisor at the remote station 202 may continuously monitor the details displayed at the display and may analyze the operation(s) of the machine 100. In addition, the operation monitoring system 200 may ease the difficulties faced by the operator(s) during the mining operation such as monitoring the operation of the machine 100. For example, the operator of the machine 100 located at the loading site 336 for loading may not be able to monitor total load of the aggregate material being loaded. However, the supervisor at the remote station 202 may observe the total load of the aggregate material loaded in the dump body 116 and may suitably instruct the operator of the excavator 304 to stop the loading of the aggregate material in that particular machine.

The operation monitoring system 200 of the present disclosure further assists in increasing the operator's productivity in the mining operation. In one example, the supervisor may instruct an operator of the excavator 304 to stop the loading of the aggregate material when the payload of the machine 302 has reached a threshold payload value. In other example, the supervisor may instruct an operator of the machine 302 to move when the machine 302 is fully loaded, so that the other machines 306, 308 waiting in the queue may move ahead to be loaded with the material from the excavator 304 reducing possible time wasted in the 'bunching state'.

In an exemplary embodiment, the operation monitoring system 200 may also be configured in the loading machine, such as, the excavator 304, and therefore the operation states of the excavator 304 may also be determined. The operation monitoring system 200 may be configured to communicate with the remote station 202 to increase the productivity of the operator of the excavator 304. In addition, if the loading site 336 includes more than one excavators 304 in the mining operations, loading details such as loading quantity of the aggregate material to the machines 100 and number of loading cycles carried out by each of the excavators 304 may be determined. In addition, time taken by each of the excavators 304 for loading the aggregate material may also be determined and analyzed to improve the efficiency of the operation.

In an embodiment, the operation monitoring system 200 may be, or implemented by, a smartphone, as a typical smartphone today includes the relevant sensors, like accelerometer, gyroscope, GPS, etc. and further a processor to analyze the signals/data. The smartphone may be disposed in the dump body 116 of the machines 100 without any major modifications. Thus, installation/retro-fitting of the operation monitoring system 200 for monitoring the operations of the machines may practically be possible for all machines, even legacy machines. The operation management using the operation monitoring system 200 of the present disclosure is very economical compared to traditional methods involving expensive equipment, complicated systems, etc.

Figure 4:
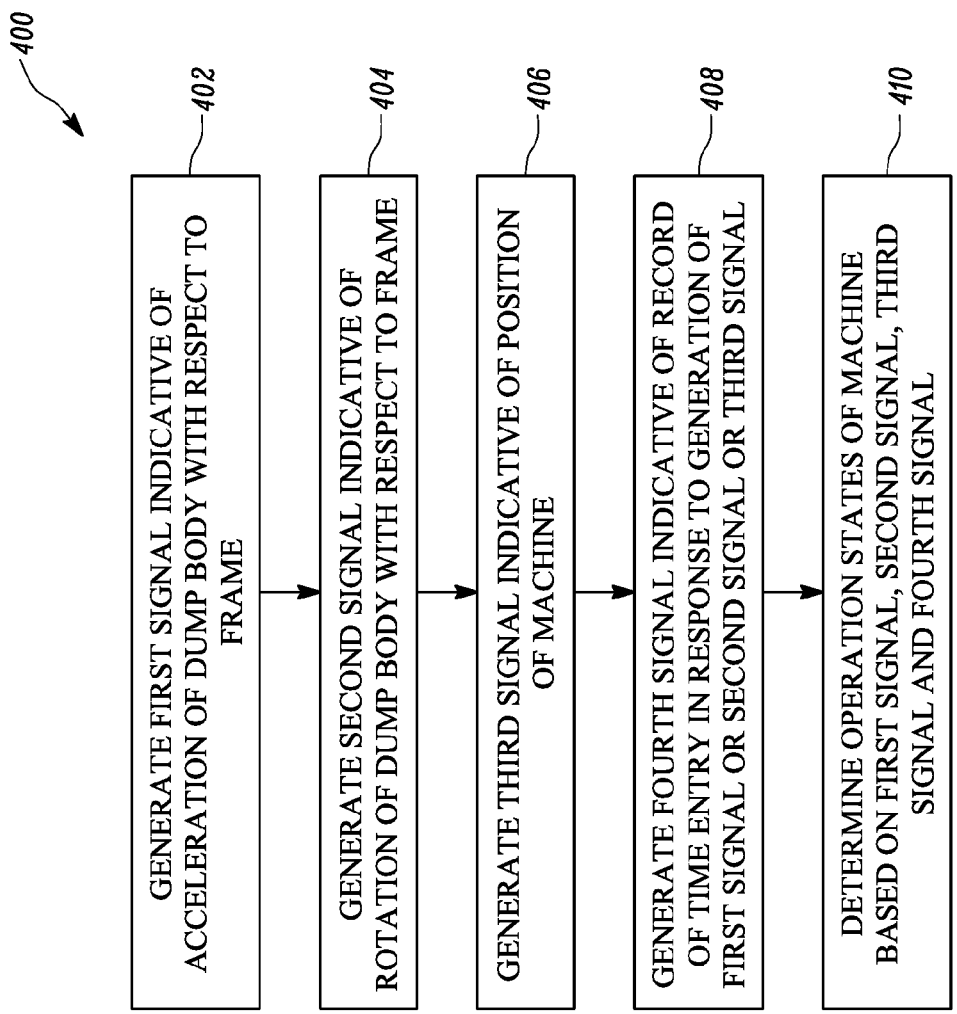
FIG. 4 is a flowchart of a method of monitoring operation of the machine according to an exemplary embodiment of the present disclosure.

FIG. 4 illustrates a flowchart of a method 400 for monitoring operation of the machine 100 according to an exemplary embodiment of the present disclosure. At step 402, the first signal indicative of acceleration of the dump body 116 with respect to the frame 110 is generated when the dump body 116 of the machine 100 is loaded with the aggregate material at the loading site 336. The accelerometer 206 present in the inertial measurement unit 204 communicates the first signal to the remote station 202 to indicate the acceleration of the dump body 116 with respect to the frame 110 of the machine 100. The acceleration of the dump body 116 with respect to the frame 110 is herein referred as a linear displacement of the dump body 116 with respect to the frame 110 when payload of the aggregate material is applied onto the dump body 116. When the aggregate material is loaded onto the dump body 116, the dump body 116 displaces from a first position to a second position linearly. Thus the rate at which the dump body 116 displaces from the first position to the second position may also be used to estimate a weight of the payload.

At step 404, the second signal indicative of a rotation of the dump body 116 with respect to the frame 110 is generated. When the machine 100 loaded with aggregate material reaches the processing facility 330, the dump body 116 of the machine 100 needs to be rotated to empty the dump body 116. The rotation of the dump body 116 is determined by the gyroscope 208 and the second signal generated by the gyroscope 208 is communicated to the remote station 202 for monitoring the operation of the machine 100.

At step 406, the position determination unit 210 located in the machine 100 determines the position of the machine 100 while traveling from the loading site 336 to the dumping site 338/processing facility 330. The position determination unit 210 generates a third signal to indicate the position of the machine 100 during travel of the machine 100 from the loading site 336 to the processing facility 330.

At step 408, the time logging unit 212 mounted in the machine 100 generates the fourth signal in response to generation of the first signal, the second signal and the third signal. The generated fourth signal is communicated to the remote station 202 for monitoring the operation of the machine 100.

At step 410, the processing unit 214 of the machine 100 determines the operation of the machine 100 based on the first signal, the second signal, the third signal, and the fourth signal. In an embodiment, the method 400 further includes generating a fifth signal indicative of a movement of the machine 100 based on the third signal and the fourth signal.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An operation monitoring system for a machine having a frame and a dump body, the operation monitoring system comprising:
    an inertial measurement unit mounted on the dump body of the machine, the inertial measurement unit comprising at least one accelerometer disposed to measure an acceleration of the dump body and generate a first signal indicative thereof, and at least one gyroscope disposed to measure a rotation of the dump body and generate a second signal indicative thereof;
    a position determination unit present on-board the machine, the position determination unit configured to determine a position of the machine, and generate a third signal indicative thereof;
    a time logging unit in communication with the inertial measurement unit and the position determination unit, the time logging unit configured to record a time entry in response to generation of at least one of the first signal, the second signal and the third signal, and generate a fourth signal indicative thereof; and
    a processing unit in communication with the inertial measurement unit, the position determination unit and the time logging unit to receive the first signal, the second signal, the third signal and the fourth signal, the processing unit configured to determine one or more operation states of the machine based at least in part on one of the received signals, wherein the one or more operation states include at least one of a bunching state, corresponding to when the machine is waiting for a loading or an unloading, or a wasting state, corresponding to at least when the machine is stationary and is not waiting for a loading or an unloading, wherein the machine is determined to be in the wasting state when:
    the first signal indicates zero acceleration of the dump body;
    the second signal indicates zero rotation of the dump body;
    the third signal indicates a position of the machine coinciding neither with the position of a loading site or a dumping site; and
    the fifth signal indicates the machine is substantially stationary.

2. The operation monitoring system of claim 1, wherein the processing unit is further configured to determine a movement of the machine based on the third signal and the fourth signal, and generate a fifth signal indicative thereof.

3. The operation monitoring system of claim 2, wherein the machine is determined to be in a loading state when:
    the first signal indicates an acceleration of the dump body; and
    the fifth signal indicates the machine is substantially stationary.

4. The operation monitoring system of claim 2, wherein the machine is determined to be in a hauling state when:
    the first signal indicates zero acceleration of the dump body;
    the second signal indicates zero rotation of the dump body; and
    the fifth signal indicates a movement of the machine.

5. The operation monitoring system of claim 2, wherein the machine is determined to be in a dumping state when:
    the second signal indicates rotation of the dump body; and
    the fifth signal indicates the machine is substantially stationary.

6. The operation monitoring system of claim 2, wherein the machine is determined to be in the bunching state when:
    the first signal indicates zero acceleration of the dump body;
    the second signal indicates zero rotation of the dump body;
    the third signal indicates a position of the machine coinciding either with the position of a loading site or a dumping site; and
    the fifth signal indicates the machine is substantially stationary.

7. The operation monitoring system of claim 2, wherein the processing unit is further configured to determine operating conditions for the machine based on the received signals, wherein the operating conditions comprises road conditions, such as grade of the road, bumps in the road and rolling resistance of the road.

8. The operation monitoring system of claim 1, wherein the position determination unit is configured to determine the position of the machine using one or more of Global Positioning System (GPS), Global Navigation Satellite System (GNSS), and trilateration/triangulation of cellular networks or Wi-Fi networks.

9. The operation monitoring system of claim 1 is a smartphone.

10. The operation monitoring system of claim 1 further comprising, a transmission unit configured to wirelessly transmit the determined operation state of the machine to a remote station.

11. A method for electronically monitoring operation of a machine having a frame and a dump body, the method comprising:
    generating by an accelerometer a first signal indicative of an acceleration of the dump body;
    generating by a gyroscope a second signal indicative of a rotation of the dump body;

generating by a position determination unit a third signal indicative of a position of the machine;
generating by a time logging unit a fourth signal indicative of a record of a time entry in response to generation of at least one of the first signal, the second signal and the third signal;
generating a fifth signal indicative of a movement of the machine based on the third signal and the fourth signal; and
determining one or more operation states of the machine based at least in part on one of the first signal, the second signal, the third signal and the fourth signal, wherein the one or more operation states include at least one of a bunching state, corresponding to when the machine is waiting for a loading or an unloading, or a wasting state, corresponding to at least when the machine is stationary and is not waiting for a loading or an unloading,
wherein the step of determining one or more operation states of the machine includes determining the operation states of the machine to be the bunching state when:
the first signal indicates zero acceleration of the dump body;
the second signal indicates zero rotation of the dump body;
the third signal indicates a position of the machine coinciding either with the position of a loading site or a dumping site; and
the fifth signal indicates the machine is substantially stationary.

12. The method of claim 11 further comprising, determining operating conditions for the machine based on the received signals, wherein the operating conditions comprises road conditions, such as grade of the road, bumps in the road and rolling resistance of the road.

13. The method of claim 11 further comprising,
generating a fifth signal indicative of a movement of the machine based on the third signal and the fourth signal; and
determining the one or more operation states of the machine to be the wasting state when:
the first signal indicates zero acceleration of the dump body;
the second signal indicates zero rotation of the dump body;
the third signal indicates a position of the machine coinciding neither with
the position of a loading site or a dumping site; and
the fifth signal indicates the machine is substantially stationary.

14. A machine comprising:
a frame;
a dump body connected to the frame; and
an operation monitoring system, comprising:
an inertial measurement unit mounted on the dump body of the machine, the inertial measurement unit comprising at least one accelerometer disposed to measure an acceleration of the dump body and generate a first signal indicative thereof, and at least one gyroscope disposed to measure a rotation of the dump body and generate a second signal indicative thereof;
a position determination unit configured to determine a position of the machine, and generate a third signal indicative thereof;
a time logging unit in communication with the inertial measurement unit and the position determination unit, the time logging unit configured to record a time entry in response to generation of at least one of the first signal, the second signal and the third signal, and generate a fourth signal indicative thereof; and
a processing unit in communication with the inertial measurement unit, the position determination unit and the time logging unit to receive the first signal, the second signal, the third signal and the fourth signal, the processing unit configured to determine one or more operation states of the machine based at least in part on one of the received signals, wherein the one or more operation states include at least one of a bunching state, corresponding to when the machine is waiting for a loading or an unloading, or a wasting state, corresponding to at least when the machine is stationary and is not waiting for a loading or an unloading;
wherein the processing unit is further configured to determine a movement of the machine based on the third signal and the fourth signal, and generate a fifth signal indicative thereof; and wherein the machine is determined to be in the bunching state when:
the first signal indicates zero acceleration of the dump body;
the second signal indicates zero rotation of the dump body;
the third signal indicates a position of the machine coinciding either with the position of a loading site or a dumping site; and
the fifth signal indicates the machine is substantially stationary.

15. The machine of claim 14, wherein the processing unit is further configured to determine operating conditions for the machine based on received signals, wherein the operating conditions comprises road conditions, such as grade of the road, bumps in the road and rolling resistance of the road.

16. The machine of claim 14 wherein the operation monitoring system further comprises a transmission unit configured to wirelessly transmit the determined operation state of the machine to a remote station.

17. The machine of claim 14 wherein the processing unit is further configured to determine a movement of the machine based on the third signal and the fourth signal, and generate a fifth signal indicative thereof; and
wherein the machine is determined to be in the wasting state when:
the first signal indicates zero acceleration of the dump body;
the second signal indicates zero rotation of the dump body;
the third signal indicates a position of the machine coinciding neither with
the position of a loading site or a dumping site; and
the fifth signal indicates the machine is substantially stationary.

* * * * *